United States Patent [19]

van Hoorn

[11] Patent Number: 5,374,303

[45] Date of Patent: Dec. 20, 1994

[54] RELEASE COMPOSITION

[75] Inventor: Bart van Hoorn, The Hague, Netherlands

[73] Assignee: Unilever Patent Holdings B.V., Vlaardingen, Netherlands

[21] Appl. No.: 35,375

[22] Filed: Mar. 22, 1993

[30] Foreign Application Priority Data

Mar. 20, 1992 [XH] Hague Agreement ............ 92200798
Sep. 16, 1992 [XH] Hague Agreement ............ 92202840

[51] Int. Cl.$^5$ ............................ B28B 7/36; B28B 7/37
[52] U.S. Cl. .................................... 106/38.22; 106/2; 106/38.24; 264/213; 264/333; 264/338; 427/133
[58] Field of Search ...................... 106/38.24, 2, 38.22; 264/300, 333, 338, 213; 427/133, 384

[56] References Cited

U.S. PATENT DOCUMENTS

| 3,875,069 | 4/1975  | Worschech et al. | 252/56 S |
| 4,115,621 | 9/1978  | Hawkins          | 428/395  |
| 4,178,260 | 12/1979 | Cook et al.      | 252/49.8 |
| 4,444,802 | 4/1984  | Winters et al.   | 106/14.13|
| 4,444,803 | 4/1984  | Winters et al.   | 106/14.3 |
| 4,609,570 | 9/1986  | Couleau et al.   | 106/38.22|

FOREIGN PATENT DOCUMENTS

| 1294038   | 6/1970  | Austria .        |          |
| 0328158   | 8/1989  | Denmark .        |          |
| 2211527   | 7/1974  | France .         |          |
| 0090707   | 10/1983 | France .         |          |
| 47-044968 | 11/1972 | Japan            | 106/38.24|
| 55-009868 | 1/1980  | Japan .          |          |
| 7869589A  | 8/1978  | United Kingdom . |          |
| 0044543   | 1/1982  | United Kingdom . |          |
| 83810936  | 9/1983  | United Kingdom . |          |

Primary Examiner—Anthony Green
Attorney, Agent, or Firm—Cushman, Darby & Cushman

[57] ABSTRACT

A biodegradable oil and water emulsion release composition for facilitating the unmoulding of hydraulic bonding material comprises as the oil component an ester of a hindered polyhydric alcohol having no hydrogen atoms attached to any carbon atom in a beta-position to any hydroxyl group and a straight or branched chain, saturated or unsaturated $C_4$-$C_{24}$ monocarboxylic acid. The ester may be partial and the partial ester may be alkoxylated. In a preferred embodiment also a straight or branched chain, saturated or unsaturated $C_8$-$C_{24}$ monohydric alcohol is present. Also a method of unmoulding has been described.

13 Claims, No Drawings

RELEASE COMPOSITION

FIELD OF INVENTION

This invention relates to a biodegradable release composition in the form of an Oil and water emulsion for facilitating the unmoulding of hydraulic bonding material such as concrete from moulds by applying an effective amount of said release composition to the mould, as well as to a method of facilitating the unmoulding of hydraulic bonding material and to a method of making a moulded, preformed article, using the said release composition.

BACKGROUND OF THE INVENTION

The use of a release agent to facilitate the unmoulding of hydraulic bonding material, such as concrete is well known. The function of such a concrete mould release agent is to avoid that cured or set concrete adheres to the mould. This can be achieved chemically by retarding the curing process in a very thin outer layer of the concrete body. The chemical action is based on the principle that by delaying or even preventing the curing or setting of a very thin layer of the concrete surface, adherence of the concrete body to the mould is prevented. A release agent should, however, not be too reactive (i.e. not have a too strong curing preventing activity), since this would detrimentally affect the strength of the concrete body. Adherence to the mould of a hydraulic bonding material, such as a cured concrete body can also be avoided physically by applying a hydrophobic release agent to the moulding surfaces so that the cured or set concrete will not adhere to the mould.

Optimal concrete mould release agents show a critical balance between chemical and physical action, depending on the type of concrete.

Effective release agents must, however, not only have an optimal balance between Chemical and physical action and adhere sufficiently to the mould, but also exhibit suitable viscosity characteristics and have a minimum hazardous effect on the environment.

Release compositions facilitating the unmoulding of hydraulic bonding material, such as concrete, are normally based on mineral oil to which kerosene has been added to adjust the viscosity and comprise additives such as retarding agents for improving the release properties, wetting agents, corrosion inhibitors, etc. The use of a mineral oil involves, however, a considerable health risk since a mineral oil may cause skin irritancy and eczema and, when used in sprayed form, lung diseases. The use of mineral oils also entails an environmental disadvantage, since mineral oils are poorly biodegradable.

There is therefore still a need for biodegradable release compositions for facilitating the unmoulding of hydraulic bonding material, such as concrete but also mud bricks, which are effective, harmless and have a minimal impact on the environment.

It is an object of the present invention to provide effective, non-toxic, non-irritant and biodegradable concrete mould release agents. It has now been found that the object of the present invention can be achieved by mineral oil and kerosene free concrete mould release compositions, based on oil and water emulsions of certain fatty acid esters, preferably oil-in-water emulsions.

DESCRIPTION OF RELATED ART

The use of triglycerides in oil-in-water concrete mould release agent compositions as a (partial) replacer of mineral oil in the oily phase has been described in German Patent Specification DE-A-2,253,497 (Improtec). Triglycerides are, however, too reactive and can therefore only partly replace a mineral oil.

In Japanese Patent Application JP-A-50-097,840 (Nippon Seikiyu KK) concrete mould release compositions are disclosed, comprising fatty acid esters of $C_1$-$C_8$ monohydric alcohols. However, particularly the methyl esters of fatty acids are characterized by a very strong retarding effect on the setting or curing process of concrete and therefore they can only partially replace a mineral oil and solvent.

In European Patent Specification EP-B-180,630 (Castrol A/S) oil-in-water concrete release agents are described, in which the oily phase may partially contain a triglyceride ester or an ester of an aliphatic carboxylic acid with a mono- or dihydric alcohol. In the divisional European Patent Application EP-A-328,158 (Kemisk Vaerk Koge A/S) concrete mould release compositions are described, comprising one or more oily esters of aliphatic carboxylic acids with mono- or dihydric alcohols, the total number of carbon atoms in the ester being 8-46 and having a melting point of at most 35° C., as the only components in the oily phase. In both patent specifications, the solvent has been replaced by water, and mineral oil may be fully replaced by said esters.

Although progress has thus been made to develop effective, non-toxic, environmentally less hazardous concrete mould release agents, the esters proposed to be used in said release agents suffer from being only poorly hydrolytically stable. This is the more a disadvantage, since the oil-in-water emulsions of these esters, due to the presence of emulsifiers, have a pH of 8-9, well above the neutral point (pH=7). These basic conditions are detrimental to the hydrolytic stability of esters of mono-and dihydric alcohols and fatty acids and as a consequence, the storage stability of such esters in such oil-in-water emulsions leaves much to be desired.

SUMMARY OF THE INVENTION

It has now been fouled that esters of hindered polyhydric alcohols and aliphatic carboxylic acids in which in the polyhydric alcohol no hydrogen atoms are attached to any carbon atom in a beta position to any hydroxyl group have the right chemical reactivity and can therefore fully replace mineral oil in oil-in-water concrete mould release compositions and exhibit even under basic conditions a good hydrolytic stability.

Thus, these esters of hindered polyhydric alcohols and aliphatic carboxylic acids do neither exhibit the disadvantage of triglyceride esters (too reactive) nor those of mono- and dihydric alcohol esters (poor hydrolyric stability).

The present invention therefore relates to a biodegradable release composition in the form of an oil and water emulsion for facilitating the unmoulding of hydraulic bonding material such as concrete from moulds by applying an effective amount of said release composition to the mould, said release composition comprising as the oil component an ester of a hindered polyhydric alcohol having no hydrogen atoms attached to any carbon atom in a beta-position to any hydroxyl group and an aliphatic monocarboxylic acid.

DETAILED DESCRIPTION OF INVENTION

Suitable hindered polyhydric alcohols having no hydrogen atoms attached to any carbon atoms in a beta-position to any hydroxyl group may be selected from the group consisting of neopentylglycol, pentaerythritol, dipentaerythritol, tripentaerythritol, trimethylolethane, trimethylolpropane, trimethylolbutane, ditrimethylolpropane, and mixtures thereof.

The aliphatic monocarboxylic acid is selected from the group consisting of straight or branched chain, saturated or unsaturated, monocaboxylic acids having from 4 to 24 carbon atoms. Also mixtures of these various types of fatty acids may be used.

The hindered polyhydric alcohol can be fully esterified with the aliphatic monocarboxylic acids. Partial esterification is also possible, as long as the number of free hydroxyl groups is not greater than one per molecule. If the number of free hydroxyl groups is greater than one per molecule, the hydrolyric stability may decrease. Non-esterified hydroxyl groups of the hindered polyhydric alcohol may be alkoxylated, such as ethoxylated and/or propoxylated with less than 10, preferably less than 5, ethylene oxide or propylene oxide units per ester molecule.

The oily components in the oil land water emulsion, comprising the said hindered polyhydric alcohols, may be present in an amount of 5–95% by weight of the total emulsion. Although small amounts of mineral oil can be added, this is less advantageous, in view of the biodegradability of the emulsion. Preferably, the oil and water emulsion is an oil-in-water emulsion. Preferably, the emulsion comprises 5–95% by weight of water.

The oil and water emulsion preferably is stabilized by non-ionic surfactants, such as ethoxylated fatty acids or fatty alcohols with 8 to 24 carbon atoms. Non-ionic surfactants are normally used in combination with anionic surfactants like sodium, potassium, alkanolamine, lower amine or ammonium salts of fatty acids. Sodium alkenesulphonates are also a suitable class of anionic surfactants. In view oil environmental effects, the use of large amounts of lower amine or ammonium fatty acid salts as anionic surfactants is less preferred.

The emulsions can be made as a product ready for use, with water in the desired amount present, or may alternatively be supplied as a concentrate, which may be diluted to the required concentration prior to use.

To obtain stable emulsions, the emulsification can be carried out in conventional equipment such as homogenizers and high speed mixers.

It has also been found that in the release composition according to the present invention the amount of emulsifiers could be markedly reduced, if in addition to the esters of hindered polyhydric alcohols and aliphatic carboxylic acids also higher aliphatic monohydric alcohols are used in the composition.

As the higher aliphatic monohydric alcohol may be used a straight or branched chain, saturated or unsaturated monohydric alcohol having from 8 to 24 carbon atoms. By the addition of the fatty alcohol, such as stearyl alcohol, iso-stearyl alcohols, palmityl alcohol, and the like, a very smooth surface of the concrete was obtained. Also mixtures of fatty alcohols may be used. The amount of alcohol may vary from 5% to 45%, preferably from 10% to 35% by weight of the total release composition.

The present invention also relates to a method for facilitating the unmoulding of a hydraulic bonding material, such as concrete, from a mould which comprises applying an effective amount of the biodegradable release composition according to the present invention to the moulding surfaces to said mould, casting said hydraulic bonding material into said mould and allowing the said hydraulic bonding material to set or cure.

The present invention also relates to a method of making a moulded, pre-formed article, which comprises casting a hydraulic bonding material such as concrete into a mould treated with an effective amount of the release biodegradable composition according to the present invention, permitting the said hydraulic bonding material to set or cure and removing the set or cured hydraulic bonding material from the mould.

The invention will now be further illustrated by the following examples.

EXAMPLES 1–7

Mould release compositions were prepared starting from the following concentrates (amounts in wt %)

| Substance | 1 | 2 | 3 | 4 | 5 | 6 | 7 |
|---|---|---|---|---|---|---|---|
| Trimethylolpropane dioleate | — | — | — | — | — | — | 80 |
| Trimethylolpropane trioleate | 81 | 44 | 85 | 85 | 81 | — | — |
| Trimethylolpropane ester of a mixture of saturated $C_8/C_{10}$ straight chain monocarboxylic acids | — | 35 | — | — | — | 35 | — |
| Trimethylolpropane dioleate ethoxylated with 5 moles of ethylene oxide | — | — | — | — | — | 44 | — |
| Glycerol mono-oleate | 4 | 4 | — | — | 4 | 3 | 10 |
| Polyethylene glycol (400) mono-oleate | 5 | — | 5 | — | 5 | — | — |
| Oleic acid ethoxylated with 10 moles of ethylene oxide | — | — | — | — | — | 8 | — |
| Synperoiiic All (Trade Mark; ex ICI Ltd; a synthetic primary linear $C_{13}$–$C_{15}$ fatty alcohol condensed with 11 moles of ethylene oxide; HLB 13.9; hydroxyl value 81; pour point 27° C.) | — | 9 | — | 5 | — | — | 5 |
| Olein | 3 | 3 | 3 | 3 | 3 | 3 | 3 |
| Sodium alkene sulphonate | 5 | 3 | 5 | 5 | 5 | 5 | — |
| Mono-ethanol amine | 2 | 2 | 2 | 2 | 2 | 2 | 2 |

Of each of these concentrates a 15% by weight oil-in-water emulsion was prepared (i.e. in each case 15% by weight of the concentrate was emulsified in water) using a standard high speed mixing apparatus at 20° C.

The mould release composition in an form of an oil-in-water emulsion thus obtained was applied to a steel mould by spraying in an amount of 35 g/m² and the concrete was cast into the mould 5–15 minutes after the spraying and vibrated for 5 seconds. The setting temperature was 15° C. and the setting time 24 hrs. After setting of curing the bodies were demoulded.

The following results were obtained.

| Example No. | coloured of hardened concrete surface[1] | holes due to air bubbles in hardened concrete surface[1] | clearliness of mould after use[1] | demoulding quality[1] |
| --- | --- | --- | --- | --- |
| 1 | 4 | 4 | 3 | 4 |
| 2 | 4 | 4 | 3 | 4 |
| 3 | 4 | 4 | 3 | 4 |
| 4 | 4 | 4 | 3 | 4 |
| 5 | 4 | 4 | 3 | 4 |
| 6 | 3 | 4 | 2 | 4 |
| 7 | 4 | 4 | 3 | 4 |

[1] Very good = 5
Good = 4
Reasonable = 3
Moderate = 2
Bad = 1

In each example the, colour was good without any formation of patches. Also the amount of dust attached to the mould after demoulding was very restricted. The amount of holes depends very much on the type of concrete used and the duration of the vibration treatment. In all cases the concrete used was prepared by using a mixture of Portland A and Portland C cement.

EXAMPLES 8-9

So-called high workability concrete was prepared from:

| Portland cement (DPC) | 3.0 kg |
| --- | --- |
| Sand | 6.53 kg |
| Aggregate | |
| No. 10 | 3.76 kg |
| No. 20 | 8.46 kg |
| Water | 1.85 kg |
| Plasticiser | 1.70 kg |

The release compositions as indicated below were sprayed on horizontal steel moulds (0.4 m×0.4 m×0.1 m). After filling the mould with concrete and vibrating it in order to destroy air bubbles, the concrete was hardened for about 18 hrs at room temperature. After handling the concrete slabs were removed from the moulds and a couple of items were examined.

| Substance | Example (wt %) | |
| --- | --- | --- |
| | 8 | 9 |
| Trimethylolpropane ester of coconut oil fatty acids | 81 | 64 |
| Iso-stearyl alcohol | 10 | 27 |
| Olein | 7 | 7 |
| Monoethanol amine | 2 | 2 |

A 40% by weight oil-in-water emulsion of the concentrate of Example 8 and a 30% by weight oil-in-water emulsion of the concentrate of Example 9 was used and compared with a commercial release agent based on a mixture of a mineral oil and a solvent. The following results were obtained:

| Example | Holes in surface | Colour of surface | Structure of surface | Mould cleanliness |
| --- | --- | --- | --- | --- |
| 8 | very good | very good | good | good |
| 9 | very good | very good | good | good |
| commercial release agent | very good | good | reasonable | good |

The concrete surface in all cases was marble-like, which is excellent. The colour of the concrete surface treated with the products according to the present invention was better than that of the surface treated with the commercial release agent. The commercial product was not biodegradable, however, and had a very bad smell.

In general, the surface of the concrete, when using the release composition according to the present invention, is of very high quality, i.e. the surface is not pitted with air bubbles, but is smooth and Uniform in colour, which is particularly advantageous in using the composition with light coloured or white concrete.

I claim:

1. A method for facilitating the release of a hydraulic bonding material from a mould which comprises applying an effective mould releasing amount of a biodegradable release composition in the form of an oil and water emulsion, said release composition comprising as the oil component an ester of an aliphatic monocarboxylic acid and a hindered polyhydric alcohol having no hydrogen atoms attached to any carbon atom in a beta-position to any hydroxyl group selected from the group consisting of pentaerythritol, dipentaerythritol, tripentaerythritol, trimethylolethane, trimethylolpropane, trimethylolbutane, ditrimethylolpropane, and mixtures thereof to the moulding surfaces of said mould, casting said hydraulic bonding material into said mould, allowing said hydraulic bonding material to set or cure, and releasing said hydraulic bonding material from said mould.

2. A method of making a moulded, preformed article, which comprises casting a hydraulic bonding material in a mould treated with an effective mould releasing amount of a biodegradable release composition in the form of an oil and water emulsion, said release composition comprising as the oil component an ester of an aliphatic monocarboxylic acid and a hindered polyhydric alcohol having no hydrogen atoms attached to any carbon atom in a beta-position to any hydroxyl group selected from the group consisting of pentaerythritol, dipentaerythritol, tripentaerythritol, trimethylolethane, trimethylolpropane, trimethylolbutane, ditrimethylolpropane, and mixtures thereof, permitting said hydraulic bonding material to set or cure and removing the set or cured hydraulic bonding material from the mould.

3. A method according to claim 1 or 2, in which the ester is a partial ester.

4. A method according to claim 1 or 2, in which non-esterified hydroxyl groups are alkoxylated such that an ester molecule contains at most 10 alkylene oxide units.

5. A method according to claim 1 or 2, in which non-esterified hydroxyl groups are alkoxylated such that an ester molecule contains at most 5 alkylene oxide units.

6. A method according to claim 4, in which the non-esterified hydroxyl groups are ethoxylated or propoxylated.

7. A method according to claim 5, in which the non-esterified hydroxyl groups are ethoxylated or propoxylated.

8. A method according to claim 1 or 2, in which the aliphatic monocarboxylic acid is selected from the group consisting of straight or branched chain, saturated or unsaturated, monocarboxylic acids having from 4 to 24 carbon atoms.

9. A method according to claim 1 or 2, in which the oil and water emulsion comprises from 5 to 95% by weight of water.

10. A method according to claim 1 or 2, in which the oil and water emulsion comprises from 5 to 95% by weight of the ester.

11. A method according to claim 1 or 2, in which the oil and water emulsion is an oil-in-water emulsion.

12. A method according to claim 1 or 2, in which the release composition further comprises a straight or branched chain saturated or unsaturated monohydric alcohol having from 8 to 24 carbon atoms.

13. A method according to claim 1 or 2, in which the release composition further comprises a straight or branched chain saturated or unsaturated monohydric alcohol having from 8 to 24 carbon atoms in an amount of from 5% to 45% of the total composition.

* * * * *